United States Patent [19]

Farr et al.

[11] Patent Number: 4,988,148
[45] Date of Patent: Jan. 29, 1991

[54] HYDRAULIC ANTI-LOCK BRAKING SYSTEMS FOR VEHICLES

[75] Inventors: Glyn P. R. Farr, Warwickshire; Anthony E. Martin, Birmingham; Robert G. Fuller, Coventry, all of England

[73] Assignee: Lucas Industries public limited company, England

[21] Appl. No.: 317,780

[22] Filed: Mar. 2, 1989

[30] Foreign Application Priority Data

Mar. 9, 1988 [GB] United Kingdom ............... 8805598
Jul. 21, 1988 [GB] United Kingdom ............... 8817412

[51] Int. Cl.⁵ .............................................. B60T 8/44
[52] U.S. Cl. ..................................... 303/116; 303/113
[58] Field of Search ................ 303/10, 113, 114, 115, 303/116, 117, 119; 188/181 A, 181 R

[56] References Cited

U.S. PATENT DOCUMENTS

| | | | |
|---|---|---|---|
| 3,746,402 | 7/1973 | Hickner et al. | 303/115 |
| 4,350,396 | 9/1982 | Mortimer | 303/116 X |
| 4,395,073 | 7/1983 | Arikawa et al. | 303/119 X |
| 4,668,024 | 5/1987 | Nakanishi et al. | 303/116 X |
| 4,778,227 | 10/1988 | Bayliss | 303/113 X |

FOREIGN PATENT DOCUMENTS

| | | | |
|---|---|---|---|
| 0078861 | 4/1983 | Japan | 303/116 |
| 2187521 | 9/1987 | United Kingdom | 303/114 |

Primary Examiner—Duane A. Reger
Attorney, Agent, or Firm—Laff, Whitesel, Conte & Saret

[57] ABSTRACT

In an hydraulic anti-lock braking system a modulator incorporates a valve responsive to anti-lock signals, a flow valve, and an expansion chamber to which fluid is relieved from a brake in an anti-lock mode. The flow valve is arranged so that the output from a pump is shared between the brake and the master cylinder, and a restrictor located in parallel with the flow valve is adapted to attenuate the pressure oscillations of the system.

11 Claims, 8 Drawing Sheets

HYDRAULIC ANTI-LOCK BRAKING SYSTEMS FOR VEHICLES

This invention relates to hydraulic anti-lock braking systems for vehicles of the kind in which the supply of hydraulic fluid from a supply, suitably a master cylinder, to a brake on a wheel is modulated in an anti-lock mode by a modulator in accordance with the behaviour of the braked wheel, and a pump is adapted to generate the energy necessary to recover fluid after the pressure applied to the brake has first been released to prevent the wheel from locking.

An anti-lock system of the kind set forth is disclosed in EP-A-No. 0202845. In this known system the modulator incorporates a single solenoid-operated valve responsive to anti-lock signals, and a flow valve. For normal brake applications, the flow valve permits free flow from the master cylinder to the brake. In an anti-lock mode, however, fluid is relieved from the brake to an expansion chamber, and the flow valve is adapted to meter the flow of fluid from the master cylinder to the brake at a controlled rate. At the same time the pump is operative to return fluid from the expansion chamber back to the master cylinder. The flow valve and the pump rate are arranged to produce similar flow rates so that the reaction at the foot is minimal. However, because the output characteristic of the pump is cyclic and the flow valve characteristic is constant, the pumped activity is sensed as an reaction or "feel" at the brake pedal, accompanied by noise transmitted back through the bulkhead of the vehicle.

One way to reduce this sensitivity would be to add a restrictor within the line between the modulator and the master cylinder. This would interfere with the normal operation of the brake.

Alternatively a restrictor could be fitted between the pump and the flow valve. This would restrict the full pump output itself, and not the difference between the pump output and the flow valve output. In addition, damage to the pump might occur.

Another solution would be to locate a restrictor between the modulator and the master cylinder and provide a one-way valve to permit full flow from the master cylinder to the brake. To obtain a rapid release of brake pressure, another one-way valve would have to be located between the brake and the master cylinder. Although this solution is technically acceptable, it uses too many parts for it to be acceptable from a commercial standpoint.

According to one aspect of our invention, in a hydraulic anti-lock braking system of the kind set forth the modulator incorporates a valve responsive to anti-lock signals, a flow valve, and an expansion chamber to which fluid is relieved from the brake in a anti-lock mode, the flow valve is arranged so that the output from the pump is shared between the brake and the master cylinder, and a restrictor located in parallel with the flow valve is adapted to attenuate the pressure oscillations of the system.

For normal brake applications free flow is permitted from the master cylinder to the brake. In an anti-lock mode fluid is relieved from the brake to the expansion chamber, and fluid withdrawn from the expansion chamber by the pump is pumped back to the brake at a rate determined by flow through the flow valve, and pumped to the master cylinder at a rate determined by flow through the restrictor.

In such an anti-lock mode the differences in flow between the pump and the flow valve are damped by the restrictor and an attenuation chamber defined between the pump, the flow valve and the restrictor.

This improves the driver's feel at the foot pedal by reducing the effect of pump oscillations and reduces pump noise otherwise transmitted back through the bulkhead.

According to another aspect of our invention in a hydraulic anti-lock braking system of the kind set forth the modulator comprises a solenoid-operated valve responsive to an anti-lock signal and having a solenoid chamber controlled by the valve, a flow valve, a inlet connection adapted normally to transmit free flow of fluid from the master cylinder to the brake, means for isolating the first inlet connection from the brake in an anti-lock mode, and a second restricted connection connected to the outlet from the pump and to the solenoid chamber by way of the flow valve, an attenuation chamber being defined between the pump, the restricted connection, and the flow valve.

In one construction the flow valve is of the spool type, and the master cylinder has two separate inlets to the flow valve, of which the first is unrestricted and is connected to an annular groove within the flow valve which, in turn, is connected to the brake, and the second is restricted by a restrictor and is connected to one side of the flow valve to feed fluid to the solenoid chamber of the valve responsive to anti-lock signals.

In another construction the flow valve is of the diaphragm pressure-responsive type and the master cylinder has two separate inlets of which the first is unrestricted and is connected to the brake by means of a poppet valve, and the second is restricted by a restrictor and is connected to the solenoid chamber of the valve responsive to anti-lock signals through the flow valve.

Some embodiments of our invention are illustrated in the accompanying drawings in which.

Figure 1:
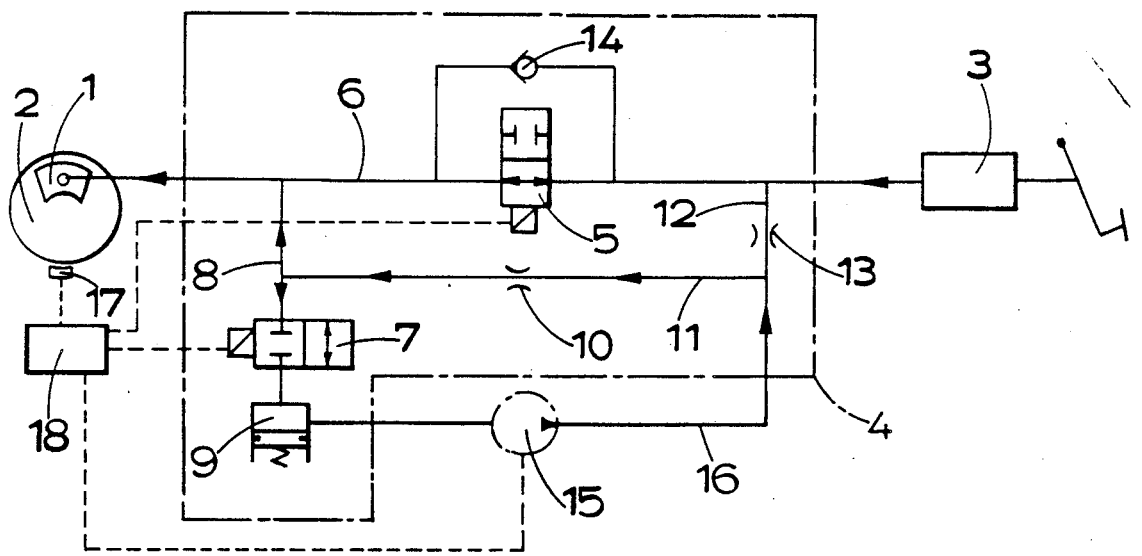
FIG. 1 is a schematic layout of a anti-lock hydraulic braking system in a normal brake-applying position.
Figure 2:
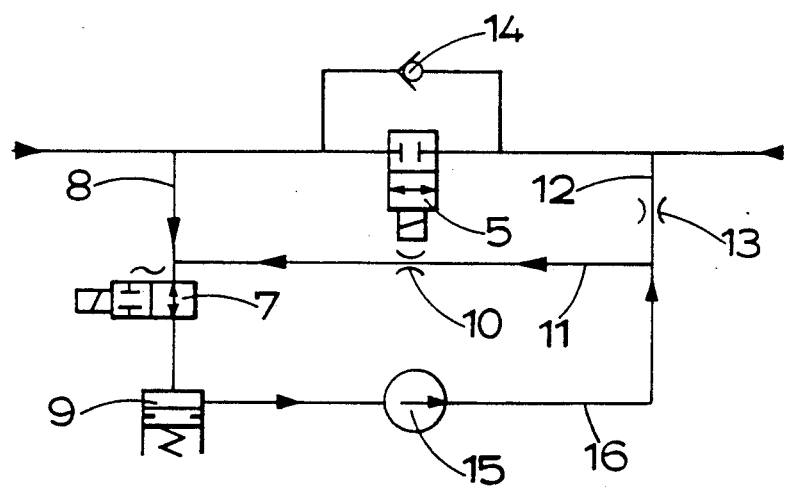
FIG. 2 is similar to FIG. 1 but with the brake relieved.
Figure 3:
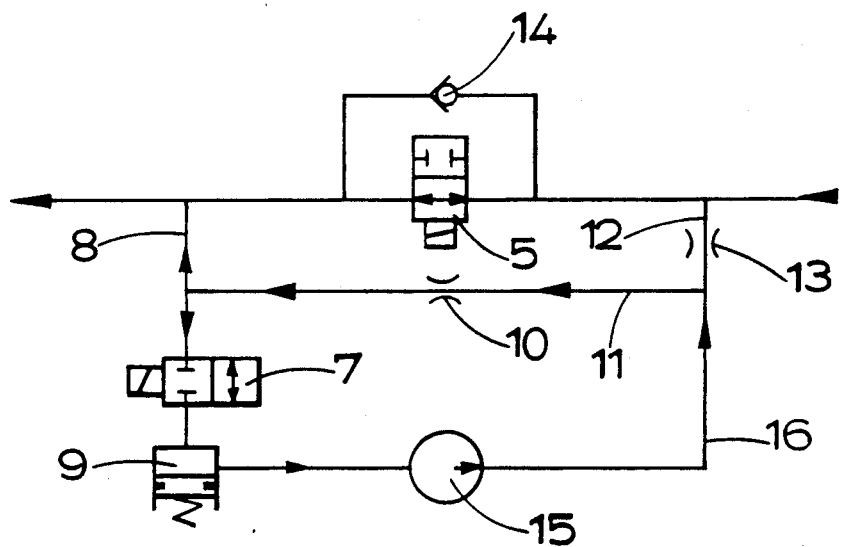
FIG. 3 shows the brake re-applied.

In the hydraulic anti-lock braking system illustrated in FIGS. 1-3 of the accompanying drawings a brake 1 on a wheel 2 is adapted to be applied by the supply of fluid from a pedal-operated master cylinder 3 through a modulator 4.

The modulator 4 comprises a first normally-open solenoid-operated valve 5 located in a supply line 6 through which fluid is supplied directly to the brake 1, a second normally-closed solenoid-operated valve 7 controlling a dump line 8 from the brake 1 to an expansion chamber 9, a flow valve 10 located in a line 11 connected between the dump line 8 on the upstream side of the valve 7 and a return line 12 connected between the master cylinder 3 and the valve 5, and a restrictor 13 in the return line. A one-way valve 14 is connected in parallel with the valve 5.

A pump 15 driven by a motor, or from the prime mover of the vehicle, is connected in a line 16 leading from the expansion chamber 9 to the intersection of the line 11 with the line 12.

The speed of rotation of the wheel 2 is sensed by a speed sensor 17, the signals from which are fed to a control module 18 which, in turn, is operative to send energizing current to the solenoids of the two valves 5 and 7 in accordance with the behaviour of the wheel 2.

Normally the valve 5 is open so that the master cylinder 3 is in open communication with the brake 1, and the valve 7 is closed to isolate the expansion chamber 9 from the brake. The pump 15 is inoperative with its motor de-energized or disabled.

In the event of an anti-lock signal being emitted by the speed sensor 17, as shown in FIG. 2, the valve 5 closes to isolate the master cylinder 3 from the brake 1, and the valve 7 opens so that fluid from the brake 1 is dumped to the expansion chamber 9. At the same time the pump 15 is driven to draw fluid from the chamber 9 and pump it to the brake 1 through the flow valve 10 and to the master cylinder 3 through the restrictor 13.

When the wheel recovers the valve 7 closes and the valve 5 opens. The fluid withdrawn from the expansion chamber 9 by the pump 15 is pumped back to the brake 1 at a rate determined by flow through the flow valve 10, and back to the master cylinder at a rate determined by flow through the restrictor 13.

The flow valve 10 and the restrictor 13 automatically define an attenuation system since the flow valve 10 automatically provides an attenuation volume between the pump 15 and the restrictor 13 back to the master cylinder 3. The flow valve 10 gives better attenuation than a fixed "high" stiffness volume and has an effect similar, in practice, to that of an hydraulic accumulator. Pressure spikes from the pump 15 will cause the volume upstream of the flow valve 10 to increase, thus reducing its amplitude.

Since the flow from the pump 15 is split between the master cylinder 3 and the brake 1, the attenuation system only attenuates the flow back to the master cylinder 3.

Positioning the flow valve 10 between the restrictor 13 and the outlet from the pump 15 reduces the amplitude of the pressure oscillations fed back to the pump 15 compared with a "stiff" volume. This will reduce the wear on the pump 15, enabling its life to be increased.

In the system described above, should the master cylinder 3 be released with the valve 5 in a closed position, fluid can then be returned to the master cylinder 3 through the one-way valve 14.

Figure 4:
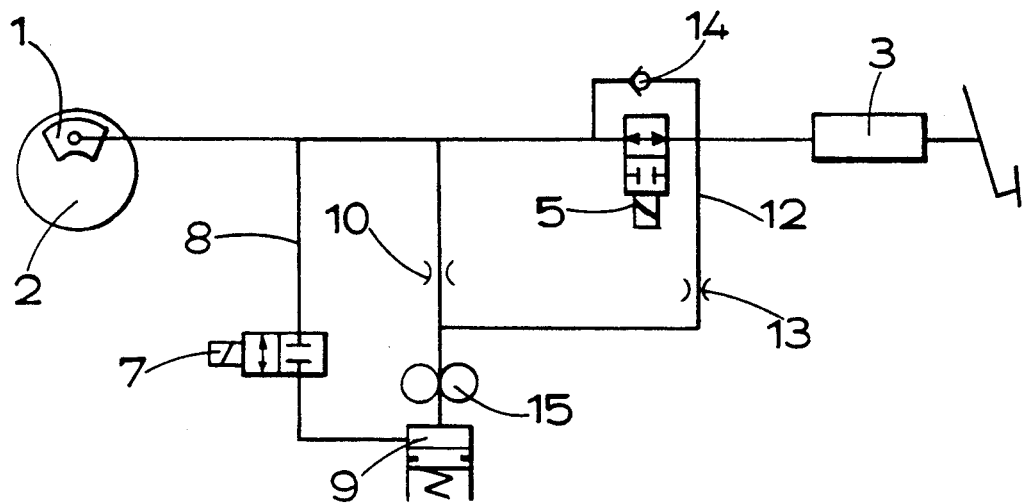
FIG. 4 is a schematic layout of another anti-lock hydraulic braking system.

In the system shown in the layout of FIG. 4, instead of being positioned in the return line 16, 12 to the master cylinder 3, the flow valve 10 is positioned in a return to the brake 1. The return line to the master cylinder 3 containing the restrictor 13 is connected between the pump 15 and the flow valve 10.

The construction and operation of the system of FIG. 4 is otherwise the same as that of FIGS. 1-3, and corresponding reference numerals have been applied to corresponding parts.

Figure 5:
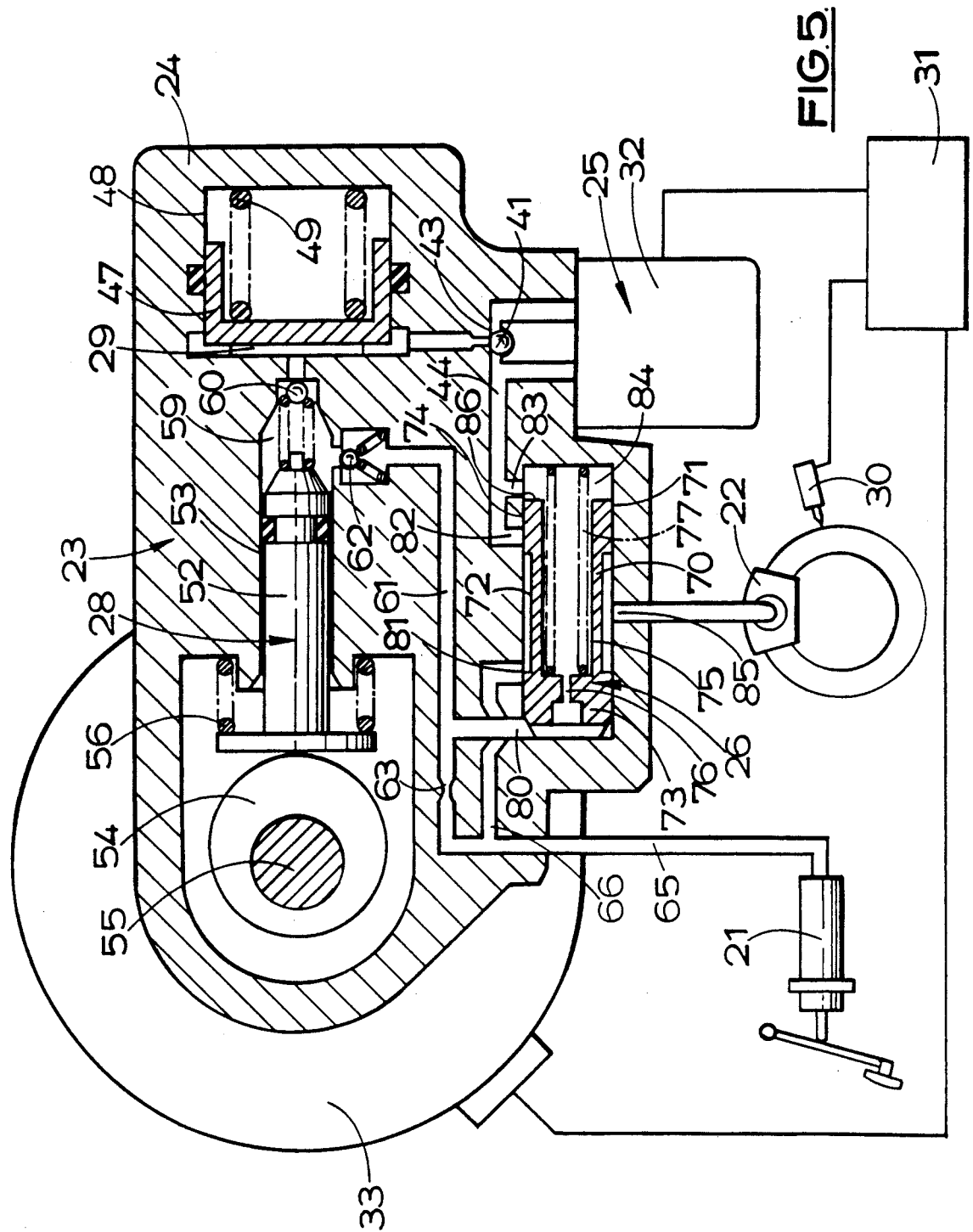
FIG. 5 is a layout of another anti-lock hydraulic braking system.

The anti-lock braking system illustrated in FIG. 5 of the drawings comprises a pedal-operated hydraulic master cylinder 21 for operating a wheel brake 22, and a modulator 23.

The modulator 23 comprises a housing 24 in which is incorporated a solenoid-operated exhaust valve 25, a flow-control regulator valve 26, a pump 28, and an expander chamber 29.

A wheel speed sensor 30 supplies electrical wheel speed signals to a control module 31. The control module 31 analyses the speed signals and when it recognises a critical speed signal it causes an electrical current to energise the solenoid 32 of the exhaust valve 25 and also, separately, to operate an electric motor 33 for driving the pump 28.

The solenoid-operated exhaust valve 25 comprises an armature incorporating a valve head 41 which is normally urged into engagement with a seating 43 between a passage 44 leading to the regulator valve 26 and the expander chamber 29, by means of a spring. The chamber 29 constitutes a substantially constant, low pressure, reservoir for the pump 28 and is closed at its upper end by an expander piston 47 working in a portion 48 of a bore of stepped outline which portion is of largest diameter. Normally a compression spring 49 urges the expander piston 47 into an advanced position in which the effective volume of the expander chamber 29 is at a minimum.

The pump 28 comprises a plunger 52 which works in the portion 53 of the stepped bore which is of smaller diameter. The plunger 52 is driven in one direction during a power stroke by an eccentric cam 54 on a drive shaft 55 from the electric motor 33, and in the opposite direction, during an induction stroke, by a spring 56. During the induction stroke fluid is drawn from the chamber 29 and into a pumping chamber 59 at the outer end of the stepped bore through a one-way inlet valve 60, and during the power stroke fluid is discharged from the chamber 59 and into a passage 61 leading to the master cylinder 21 and the regulator valve 26 through a one-way outlet valve 62. A restrictor 63 is located in the passage 61.

The passage 61 joins a passage 65 from the master cylinder at a branch 66 which comprises an inlet passage leading to the flow-control regulator valve 26 and located between the master cylinder 21 and the restrictor 63.

The flow-control regulator valve 26 comprises a spool 70 working in a bore 71. The spool 70 is provided at opposite ends of a radial groove 72 with axially spaced lands 73 and 74. The spool 70 has a longitudinal bore 75 which terminates at its inner end remote from the exhaust valve 25 in a restricted orifice 76. A spring 77 acts normally to urge the spool 70 into a first position in engagement with the adjacent end of the bore 71. In this position the first land 73 is located between a first port 80 and second port 81, and the second land 74 closes a third port 82 in communication with the passage 44 and is spaced from a fourth exhaust port 83 so that the port 83 in permanent communication with the passage 44 is also open to a chamber 84 at the inner end of the bore 71 on the downstream side of the orifice 76. Irrespective of the position of the spool 70 in the bore 71 the groove 72 is always in free communication with an outlet port 85 connected to the brake 22.

The port 80 is connected to the passage 61 between the restrictor 63 and the valve 62, and the port 81 is connected to the passage 61 between the restrictor 63 and the master cylinder 21.

In the inoperative position shown the pump 28 is disabled. The solenoid 32 is de-energized and the exhaust valve 25 is held in a closed position by the spring acting on the valve head 41. The spool 70 is held against the inner end of the bore 71 to permit free and unrestricted communication between the master cylinder 21 and the brake 22 through the port 81, the groove 72 and the port 85.

When the brake 22 is to be applied, fluid is supplied from the master cylinder 1 to the brake 22 through the fully open port 81, the groove 72, and the port 85.

When a skid signal is received, the control module 31 is operative to energize the solenoid 32 and the electric motor 33. The solenoid 32 withdraws the armature against the force in its spring, in turn urging the valve head 41 away from the seating 43 to open the exhaust valve 25, and energization of the motor 12 causes the shaft 55 to rotate.

Since the chamber 84 is connected to the expander chamber 29 the consequent pressure drop across the fixed orifice 76 causes the spool 70 to move relatively towards the exhaust valve 25 against the force in the spring 77. Initial movement of the spool 70 in this direction causes the land 73 to close the inlet port 81, with which it defines an inlet valve, which isolates the master cylinder 21 from the brake 22. Further movement of the spool 70 in the same direction causes the land 74 to uncover the third port 82 in turn to place the ports 82 and 85 in communication through the groove 72 with the result that the brake 22 is also connected to the expander chamber 29 to relieve the pressure applied to the brake 22. Finally the spool 70 moves into a rest position at which the land 74 hovers at the edge of the exhaust port 83, with the outer edge 86 of the land 74 constituting a variable orifice with the port 83.

The pressure returned from the brake 22 to the expander chamber 29 moves the expander piston 47 relatively against the force in the spring 49. The pump 28 is operable to draw fluid at low pressure from the expander chamber 29 and into the pumping chamber 59 through the inlet valve 60, and then pump it from the chamber 59 and into the passage 61 through the outlet valve 62 as described above.

The output from the pump 28 is shared between the master cylinder 21 to which it is returned through the restrictor 63, and the brake 22 under the control of the flow valve 26. Specifically the output from the pump 28, minus the output via the flow control valve 26, is returned to the master cylinder 21.

As in the construction of FIGS. 1–4, the effect of the difference between the two outputs is reduced by the restrictor 63 and the attenuation chamber defined between the pump 28, the restrictor 63, and the flow valve 26.

In the construction described above with reference to FIG. 5, both ports 82 and 83 are connected directly to the expander chamber 29 when the valve head 41 is spaced from its seating 43. Thus fluid is returned from these ports 82 and 83 at an unrestricted rate. This means that in response to a skid signal the pressure applied to the brake 22 is reduced substantially to a minimum, substantially to zero. Additional work must therefore be done by the pump 28 to re-apply the brake 22, with a consequent time delay.

Figure 6:
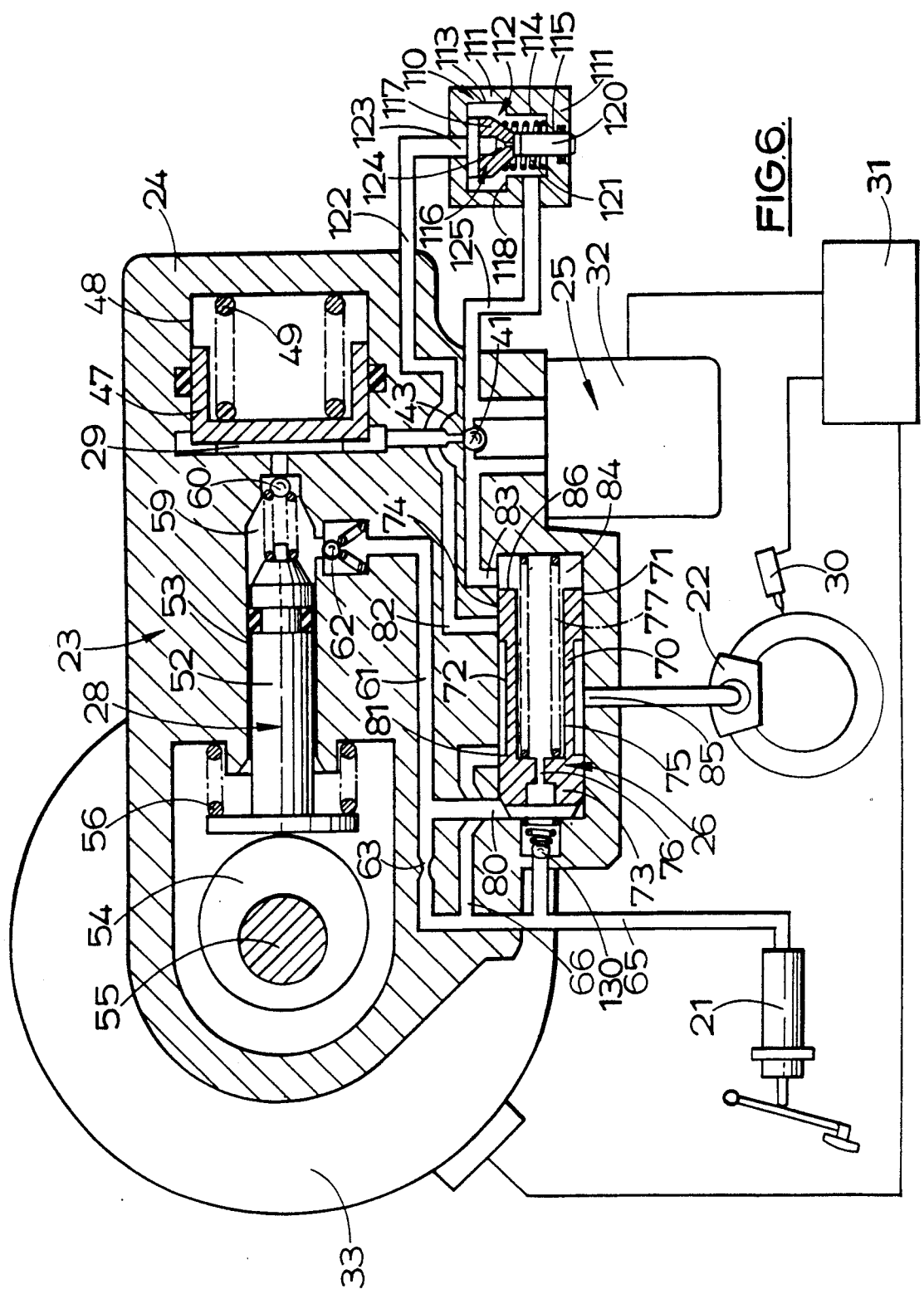
FIG. 6 is similar to FIG. 5 but showing a modification.

The anti-lock braking system illustrated in FIG. 6 of the accompanying drawings incorporates a two-rate dump valve 110 which determines the degree to which pressure applied to the brake 22 can be reduced in response to a skid signal.

As illustrated the two-rate dump valve 110 comprises a housing 111 having a stepped bore 112 comprising a first bore portion 113 of greatest diameter, a second bore portion 114 of intermediate diameter, and a third bore portion 115 of smallest diameter. A valve member 116 housed in the bore 112 comprises a valve head 117 engageable with a seating 118 at the step in diameter between the bore portions 113 and 114, and a stem 120 carrying the head 117 and guided for sliding movement in the bore portion 115 from which it projects at its free end. A spring 121 normally urges the head 117 away from the seating 118.

The port 82 is connected through a passage 122 to a port 123 in the housing 111 which leads into the bore portion 113, and a restricted passage 124 in the valve head 117 provides communication between the bore portions 114 and 113 when the dump valve 110 is closed with the head 117 in engagement with the seating 118. The port 83 is permanently connected through a passage 125, and the passage 125 is, itself, placed in communication with the expander chamber 29 when the solenoid-operated exhaust valve 25 opens.

The system also includes a one-way valve 130 which permits flow from the passage 65 to the flow valve 26, but which prevents return flow in the opposite direction.

In the inoperative position shown in which the exhaust valve 25 is closed to cut-off communication between the passage 125 and the dump valve 110, the port 83 is in communication with the port 82 since the dump valve 110 is open with the head 117 held away from the seating 118 by the spring 114.

When a skid signal is received, the valve head 41 is urged away from the seating 43 to open the exhaust valve 25. This connects the chamber 84 to the expander chamber 29 through the port 83, at the same time placing the dump valve 110 in communication with the expander chamber 29 through the passage 125. As in the construction of FIG. 5 the consequent pressure drop across the fixed orifice 76 causes the spool 70 to move relatively towards the exhaust valve 25 against the force in the spring 77 until the land 74 hovers at the edge of the exhaust port 83. Any resistance to movement of the spool 70 in this direction and which might otherwise be caused by the restrictor 63, is avoided by the one-way valve 130 opening automatically.

When the land 74 uncovers the port 82 so that the brake 22 is connected to it through the groove 72, fluid in the brake 22 is returned to the expander chamber 29 through the passage 122, the open dump valve 110 and the passage 125. Above a pre-set level the pressure drop across the area 115 is sufficient to cause the valve head 117 to engage with the seating 118 against the load in the spring 121.

When a skid signal is received at a pressure above the pre-set level, fluid dumped from the brake 22 is returned to the expander chamber 29, but at a reduced rate determined by the flow through the orifice 124. As the pressure falls a second, lower, pre-set level is reached when the pressure drop across the valve head 117 caused by the orifice 124 is insufficient to hold the valve head 117 in engagement with the seating 118 against the load in the spring 121. Consequently the valve head 117 moves away from the seating 118 so that fluid from the brake 22 can return to the expander chamber 29 in an unrestricted manner.

In the construction of FIG. 6, when the solenoid-operated valve 25 is open as stated above, fluid in the chamber 84 is returned directly to the expander chamber 29 and not through the two-rate dump valve 110. This has the advantage of rapidly generating a pressure differential across the flow valve 26 which ensures that, even at low pressures, the spool 70 will move relatively towards the solenoid-operated valve 25. This is particularly advantageous for a system which operates at relatively low pressures, since at such low pressures the flow valve might fail to operate.

When the solenoid-operated valve 25 is open and fluid is being dumped to the expander chamber 29 and the pump 28 is circulating fluid, the circulated fluid issuing from the port 83 is returned directly to the expander chamber 29 and therefore does not pass through the two-rate dump valve 110. This avoids any tendency for pressure to build-up behind the flow valve 26 which, otherwise, might cause the flow valve 26 to re-set with the spool 70 moving relatively away from the solenoid-operated valve 25.

The construction and operation of the system of FIG. 6 is otherwise the same as that of FIG. 5 and corresponding reference numerals have been applied to corresponding parts.

Figure 7:
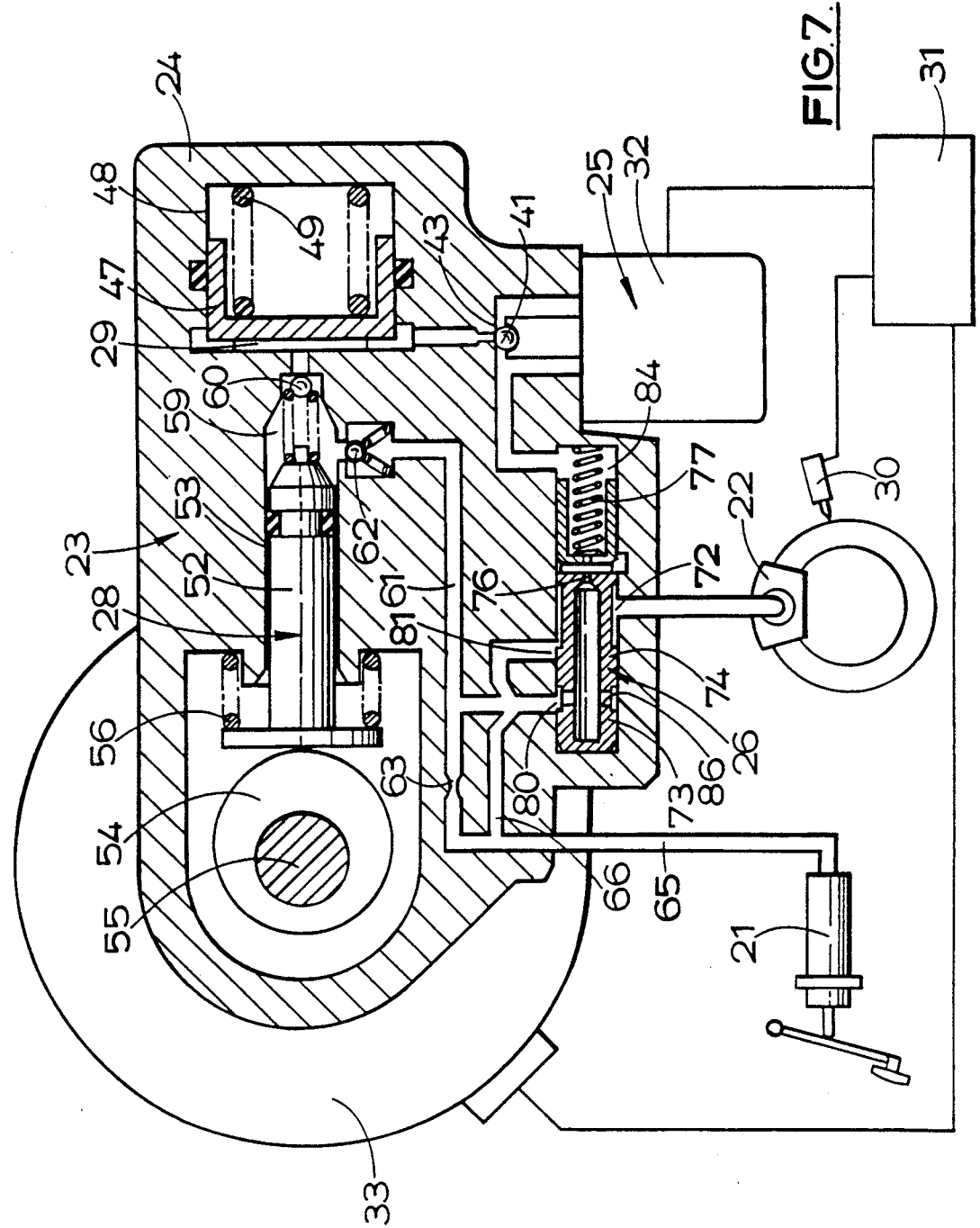
FIG. 7 is similar to FIG. 5 but showing yet another modification.

In the system shown in the layout of FIG. 7 the flow valve 26 is arranged with its metering edge 86 upstream of the fixed orifice 76.

The construction and operation of the system of FIG. 7 is otherwise the same as that of FIG. 5 and corresponding reference numerals have been applied to corresponding parts.

Figure 8:
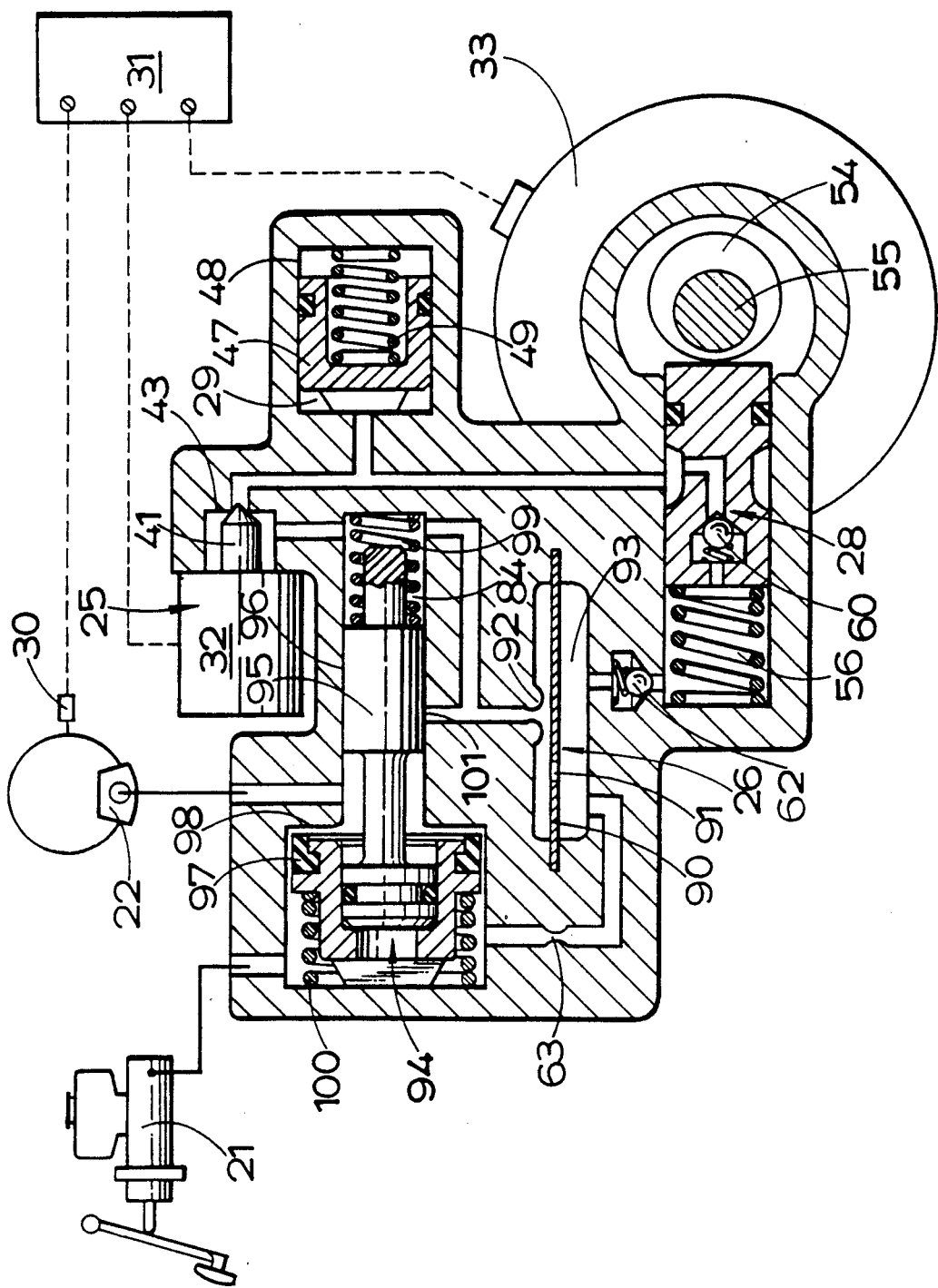
FIG. 8 is a layout of another hydraulic braking system.

In the braking system shown in the layout of FIG. 8, the flow valve 26 comprises a flexible diaphragm 90 provided with a fixed orifice 91 which establishes a pressure drop across the diaphragm 90. This controls the position of the diaphragm with respect to a seating 92 leading to the valve 25 and with which the diaphragm 90 co-operates in order to define the variable orifice. The chamber 93 on the side of the diaphragm 90 remote from the seating 92 is connected to the restrictor 63 and the output valve 62 from the pump 28.

A poppet valve 94 is located between the master cylinder 21 and the brake 22. As illustrated the poppet valve 94 comprises a spool 95 working in a bore 96 and exposed at one end to pressure on the downstream side of the flow valve 26. The spool 95 carries a head 97 which is relatively movable axially and which is normally spaced from a seating 98 between the master cylinder 21 and the brake 22 by the force in a spring 99. A light spring 100 is adapted to bias the head 97 in the opposite direction.

In the inoperative position shown in the drawing the pump 28 is disabled, the solenoid 32 is de-energized, and the head 97 is spaced from the seating 98 so that fluid can be supplied directly from the master cylinder 21 to the brake 22. The pressure from the master cylinder 21 is also supplied to the flow valve 26 and the chamber 84 through the restrictor 63.

In an anti-lock mode, the solenoid 32 is energized to retract the valve member 41 momentarily to relieve pressure in the chamber 84 to the expansion chamber 29. This causes the spool 95 to move relatively against the force in the spring 99 with the head 97 engaging with the seating 98 to isolate the master cylinder 21 from the brake 22. Once the head 97 has engaged with the seating 98, the master cylinder pressure acts through an opening in the head 97 and onto the adjacent end of the spool 95 in turn to urge the spool 95 further in the same direction. This uncovers a port 101 leading both to the flow valve 26 and the chamber 84. The pressure in the brake 22 is therefore relieved to the expansion chamber 29 through the port 101, and the chamber 84. At the same time, due to the pressure drop across the diaphragm 90, the diaphragm 90 moves towards its seating 92 to meter fluid to the brake 22, and the control module 31 switches on the motor 33 to drive the pump 28. Fluid is then forced from the expansion chamber 29 back to the attenuation chamber containing the flow valve 26, and through the restrictor 63 to the master cylinder 21.

When the brake pedal is released, fluid from the brake 22 flows back to the master cylinder 21 through the poppet valve 94. The poppet valve 94 opens fully when the spring-loaded spool 95 moves back.

The construction and operation of the system illustrated in FIG. 8 is otherwise the same as that described above with reference to FIGS. 5 and 6, and corresponding reference numerals have been applied to corresponding parts. However, since this construction does not require an accurate spool type flow valve, increased reliability can be expected when using mass produced components.

Figure 9:
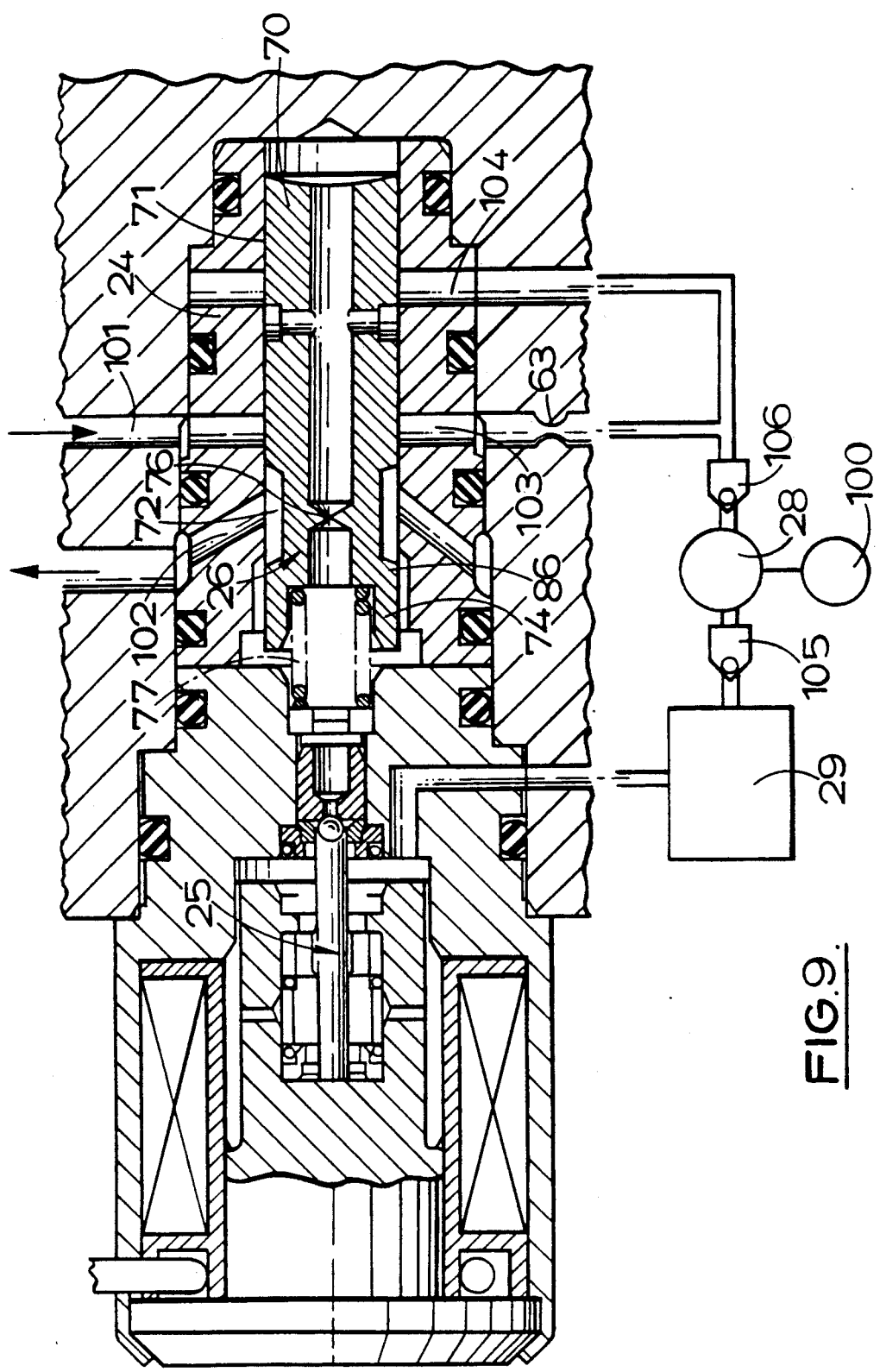
FIG. 9 is a layout of yet another hydraulic braking system.

The braking system shown in the layout of FIG. 9 is similar to FIG. 5. However, in the system of FIG. 9 the solenoid-operated exhaust valve 25 is aligned axially with the flow-control regulator valve 26, and the pump 28 and the expander chamber 29 are separate from the housing 24, the pump 28 being driven by an external motor 100. The spool 70 controls communication between an inlet port 101 from the master cylinder, and an inner outlet port 102 connected to the brake and disposed axially between the port 101 and the exhaust valve 25.

A port 103 diametrically opposite and communicating with the port 101 is connected to the pump 28 through the restrictor 63, and the pump 28 has a parallel connection to the flow-regulator valve 26 through a port 104.

When the pump 28 is operating it draws fluid from the expansion chamber 29 through a one-way valve 105 and pumps it to the ports 103 and 104 through a second one-way valve 106.

In a normal brake-applying position, the spool 70 is urged relatively away from the exhaust valve 25, which is closed to isolate the brake from the expansion chamber 29, and the groove 72 provides unrestricted communication between the port 101 and the port 102.

When a skid signal is received, the electric motor 100 is energized to drive the pump 28, and the valve 25 opens.

Due to the pressure drop across the fixed orifice 76, the spool 70 moves relatively towards the valve 25, in turn to assume the position shown in the drawing in which fluid from the brake is dumped to the expansion chamber 29. Fluid withdrawn from the expansion chamber 29 is pumped back to the master cylinder through the orifice 63 and back to the brake through passages in the spool 70 which communicates with the port 104, through the orifice 76, and through the metering orifice defined by the co-operation with the metering edge 86 of the land 74 with the port 102.

The construction and operation of the system of FIG. 9 is otherwise the same as that of FIG. 5 and corresponding reference numerals have been applied to corresponding parts.

Figure 10:
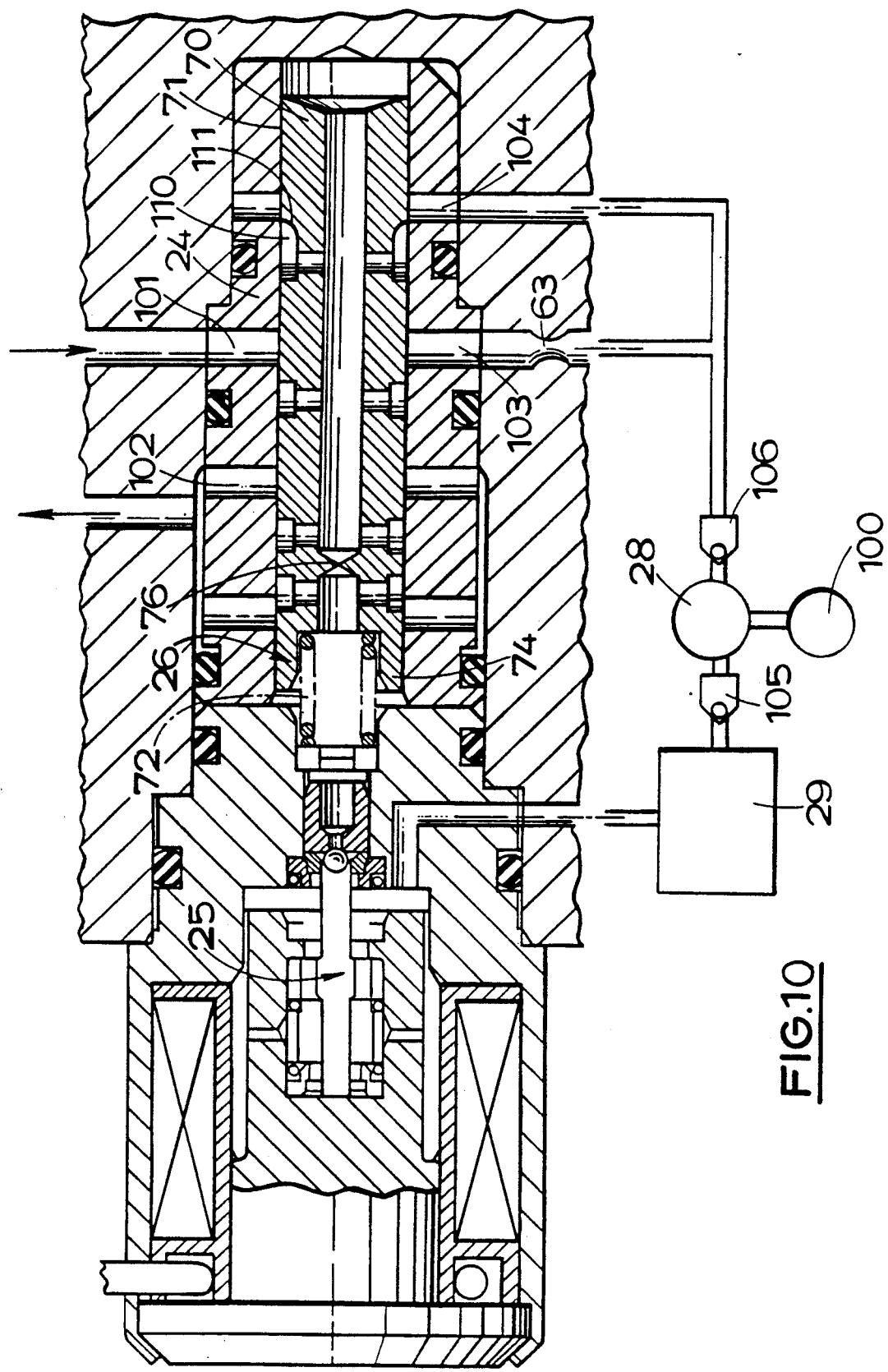
FIG. 10 is a layout similar to FIG. 8 but showing a modification.

In the system shown in the layout of FIG. 10, the groove 72 is omitted and the land 74 is slidably guided in the bore 71. The spool 70 is extended in length relatively away from the dump valve 25 to include an addition groove 110, the outer edge 111 of which co-operates with the port 104 to define the metering device which is therefore upstream of the fixed orifice 76.

The system illustrated in FIG. 10 is otherwise the same as that of FIG. 9, and corresponding reference numerals have been applied to corresponding parts.

We claim:

1. A hydraulic anti-lock braking system for vehicles comprising a master cylinder for applying hydraulic fluid under pressure to a brake on a wheel to apply said brake, a modulator responsive to the behavior of said braked wheel to modulate the supply of fluid from said master cylinder to said brake in an anti-lock mode, and a pump having an output which generates the energy necessary to recover fluid after the pressure applied to said brake had first been released to prevent said wheel from locking, wherein said modulator incorporates a first valve responsive to anti-lock signals, means defining an expansion chamber to which fluid is relieved from said brake in an anti-lock mode, a flow valve comprising a first substantially constant flow restrictor so constructed and arranged that said output from said pump is shared between said brake and said master cylinder and a second constant flow restrictor located in parallel with and additional to said flow valve for attenuating pressure oscillations of said system, operation of said second constant flow restrictor being independent of said flow valve.

2. A braking system as claimed in claim 1, wherein said first valve and said flow valve are so constructed and arranged that for normal brake application free flow is permitted from said master cylinder to said brake and in an anti-lock mode fluid is relieved from said brake to said expansion chamber, and fluid withdrawn from said expansion chamber by said pump is pumped back to said brake at a rate determined by flow through said flow valve and to said master cylinder at a rate determined by flow through the restrictor.

3. A braking system as claimed in claim 1, wherein an attenuation chamber is defined between said pump, said flow valve and said restrictor, and in an anti-lock mode differences in flow between said pump and said flow valve are damped by said restrictor and said attenuation chamber.

4. A system as claimed in claim 1, wherein said modulator comprises a first solenoid-operated valve between said master cylinder and said brake, and a second solenoid-operated valve between said brake and said expansion chamber, and said restrictor is located between said pump and a connection between said master cylinder and said first valve, said first valve being open and said second valve being closed for normal brake operation, and said first valve being closed and said second valve being open in an anti-lock mode.

5. A system as claimed in claim 4, wherein said flow valve is positioned in a return line to said master cylinder.

6. A system as claimed in claim 4, wherein said flow valve is positioned in a return to said brake, and a return line to said master cylinder and containing said restrictor is connected between said pump and said flow valve.

7. A hydraulic anti-lock braking system for vehicles comprising a master cylinder for applying hydraulic fluid under pressure to a brake on a wheel to apply said brake, a modulator responsive to the behaviour of said braked wheel to modulate the supply of fluid from said master cylinder to said brake in an anti-lock mode, and a pump having an output which generates the energy necessary to recover fluid after the pressure applied to said brake had first been released to prevent said wheel from locking, wherein said modulator comprises a solenoid-operated valve responsive to an anti-lock signal and having an expansion chamber controlled by said valve, a flow valve comprising a first substantially constant flow restrictor, a first inlet connection adapted normally to transmit free flow of fluid from said master cylinder to said brake, means for isolating said first inlet connection from said brake in an anti-lock mode, and a second connection from said master cylinder and connected to said output from said pump and to said expansion chamber by way of said flow valve, said second connection including a passage in parallel with said first inlet connection, and a second constant flow restrictor additional to said flow valve and located in said passage, an attenuation chamber being defined between said pump, said first restrictor and said flow valve, operation of said second restrictor being independent of said flow valve.

8. A system as claimed in claim 7, wherein said flow valve is of the spool type, and the master cylinder has two separate first and second inlets to said flow valve, of which the first inlet is unrestricted and is connected to an annular groove within said flow valve which, in turn, is connected to said brake, and said second inlet is second restricted by a restrictor and is connected to one side of said flow valve to feed fluid to said expansion chamber of said solenoid-operated valve responsive to anti-lock signals.

9. A system according to claim 7, wherein said flow valve is of the diaphragm pressure-responsive type, and said master cylinder has two separate first and second inlets of which said first inlet is unrestricted and is connected to said brake by means of a poppet valve, and said second inlet is restricted by said restrictor and is connected to said expansion chamber of said solenoid-operated valve responsive to anti-lock signals through said flow valve.

10. A system as claimed in claim 7, including a dump valve adapted to release fluid from said brake, wherein fluid from said brake is returned to said expansion chamber through said dump valve at a first rate for pressures below a pre-set level, and restrictor means are incorporated for controlling said release of fluid from said brake at a second rate lower than said first rate for pressures above said pre-set level.

11. A system as claimed in claim 10, wherein fluid from said pump which passes through said flow valve is returned to said expansion chamber through a passage which by-passes said dump valve.

* * * * *